(12) United States Patent
Kuo et al.

(10) Patent No.: US 12,323,710 B2
(45) Date of Patent: Jun. 3, 2025

(54) HEAD MOUNTED DISPLAY DEVICE AND CONTROL METHOD FOR EYE-TRACKING OPERATION

(71) Applicant: HTC Corporation, Taoyuan (TW)

(72) Inventors: Yan-Min Kuo, Taoyuan (TW); Jun-Lin Guo, Taoyuan (TW); Wei-Chen Chen, Taoyuan (TW); Chih-Lin Chang, Taoyuan (TW); Wei-Cheng Hsu, Taoyuan (TW); Cheng-Yu Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 80 days.

(21) Appl. No.: 18/149,156

(22) Filed: Jan. 3, 2023

(65) Prior Publication Data

US 2023/0319418 A1 Oct. 5, 2023

Related U.S. Application Data

(60) Provisional application No. 63/324,646, filed on Mar. 29, 2022.

(51) Int. Cl.
*H04N 23/695* (2023.01)
*G06F 3/01* (2006.01)
(Continued)

(52) U.S. Cl.
CPC ........... *H04N 23/695* (2023.01); *G06F 3/013* (2013.01); *G06T 7/0002* (2013.01); *G06T 7/20* (2013.01); *H04N 23/611* (2023.01); *H04N 23/64* (2023.01); *G06T 2207/30168* (2013.01); *G06T 2207/30201* (2013.01)

(58) Field of Classification Search
CPC .... H04N 23/695; H04N 23/611; H04N 23/61; G06F 3/013; G06F 3/0304; G06T 7/0002; G06T 7/20; G06T 2207/30168; G06T 2207/30201; G02B 27/0093; G02B 27/0176
See application file for complete search history.

(56) References Cited

U.S. PATENT DOCUMENTS 5,859,686 A * 1/1999 Aboutalib .............. A61B 3/113
351/221
9,223,136 B1 * 12/2015 Braun ..................... G06F 3/167
(Continued)

FOREIGN PATENT DOCUMENTS

CN 114222520 3/2022

OTHER PUBLICATIONS

"Office Action of Taiwan Counterpart Application", issued on Aug. 23, 2023, p. 1-p. 8.

*Primary Examiner* — Timothy R Newlin
(74) *Attorney, Agent, or Firm* — JCIPRNET

(57) ABSTRACT

A head-mounted display device and a control method for an eye-tracking operation are provided. The head-mounted display device includes a frame, a track, a sensor and a controller. The track is disposed on a peripheral region of the frame. The sensor is disposed on the track, and is configured to capture a target image of a target area. The controller is coupled to the sensor, is configured to generate a control signal according to the target image, and adjust a position of the sensor on the peripheral region by moving the sensor according to the control signal.

13 Claims, 4 Drawing Sheets

(51) Int. Cl.
  *G06T 7/00*     (2017.01)
  *G06T 7/20*     (2017.01)
  *H04N 23/60*    (2023.01)
  *H04N 23/611*   (2023.01)

(56) References Cited

U.S. PATENT DOCUMENTS

| | | | | |
|---|---|---|---|---|
| 10,609,486 B1* | 3/2020 | Gruben | ............... | H04R 1/105 |
| 11,287,660 B2* | 3/2022 | Yu | ............... | G02B 27/0179 |
| 11,307,659 B2* | 4/2022 | Sengelaub | ............... | H04N 5/33 |
| 2004/0061831 A1* | 4/2004 | Aughey | ............... | G06F 3/013 |
| | | | | 351/209 |
| 2006/0098087 A1* | 5/2006 | Brandt | ............... | H04N 23/61 |
| | | | | 348/E13.047 |
| 2006/0239670 A1* | 10/2006 | Cleveland | ............... | A61B 3/113 |
| | | | | 396/51 |
| 2009/0303158 A1* | 12/2009 | Takahashi | ............... | G02B 27/01 |
| | | | | 345/7 |
| 2010/0100907 A1* | 4/2010 | Chang | ............... | H04N 21/4753 |
| | | | | 715/706 |
| 2010/0110368 A1* | 5/2010 | Chaum | ............... | G02C 11/10 |
| | | | | 351/158 |
| 2011/0213549 A1* | 9/2011 | Hallas | ............... | G01C 21/20 |
| | | | | 701/533 |
| 2013/0222334 A1* | 8/2013 | Tokutake | ............... | G06F 3/0488 |
| | | | | 345/173 |
| 2013/0275869 A1* | 10/2013 | Haswell | ............... | G06Q 50/00 |
| | | | | 715/706 |
| 2014/0055342 A1* | 2/2014 | Kamimura | ............... | G06V 40/193 |
| | | | | 345/156 |
| 2015/0009574 A1* | 1/2015 | Liesecke | ............... | G02B 27/0176 |
| | | | | 359/630 |
| 2015/0288923 A1* | 10/2015 | Kim | ............... | H04N 23/62 |
| | | | | 348/14.05 |
| 2015/0378160 A1* | 12/2015 | Lee | ............... | G02B 27/0172 |
| | | | | 345/8 |
| 2016/0116979 A1* | 4/2016 | Border | ............... | G06F 3/013 |
| | | | | 345/156 |
| 2016/0165205 A1* | 6/2016 | Liu | ............... | G03H 1/268 |
| | | | | 348/40 |
| 2016/0295948 A1* | 10/2016 | Dowd | ............... | A42B 3/0473 |
| 2017/0026568 A1* | 1/2017 | Haehnichen | ............... | G08B 3/10 |
| 2017/0047046 A1* | 2/2017 | Tam | ............... | G09G 5/10 |
| 2018/0050446 A1* | 2/2018 | Kumar | ............... | A61B 17/0686 |
| 2018/0120932 A1* | 5/2018 | Sengelaub | ............... | A61B 3/113 |
| 2018/0147728 A1* | 5/2018 | Vyas | ............... | G06F 3/014 |
| 2018/0173017 A1* | 6/2018 | Imagawa | ............... | G02B 27/0176 |
| 2019/0235255 A1* | 8/2019 | Seibert | ............... | G06F 3/011 |
| 2019/0243448 A1* | 8/2019 | Miller | ............... | G06F 3/017 |
| 2019/0324272 A1* | 10/2019 | Seo | ............... | G02B 27/0172 |
| 2019/0384386 A1* | 12/2019 | Stafford | ............... | G06V 10/82 |
| 2020/0029050 A1* | 1/2020 | Antunes | ............... | H04N 23/50 |
| 2020/0064631 A1* | 2/2020 | Robbins | ............... | G06F 3/013 |
| 2020/0401220 A1* | 12/2020 | Jain | ............... | G02B 27/0093 |
| 2021/0067692 A1* | 3/2021 | Dimpas | ............... | G06V 40/165 |
| 2021/0208675 A1* | 7/2021 | Qin | ............... | G02B 27/0172 |
| 2021/0405740 A1* | 12/2021 | Alcorn | ............... | G06F 3/1446 |
| 2022/0066292 A1* | 3/2022 | Ahuja | ............... | G03B 17/561 |
| 2022/0337729 A1* | 10/2022 | Pisetta | ............... | G02B 27/0176 |
| 2023/0062777 A1* | 3/2023 | Herbig | ............... | H04N 13/25 |
| 2023/0082715 A1* | 3/2023 | Yu | ............... | G06T 5/80 |
| 2023/0308605 A1* | 9/2023 | Ritchey | ............... | H04N 21/4305 |
| 2023/0316759 A1* | 10/2023 | Agrawal | ............... | G06V 20/52 |
| | | | | 382/103 |
| 2023/0367857 A1* | 11/2023 | Haller | ............... | H04N 23/80 |
| 2024/0126366 A1* | 4/2024 | Watola | ............... | C22B 15/00 |

* cited by examiner

HEAD MOUNTED DISPLAY DEVICE AND CONTROL METHOD FOR EYE-TRACKING OPERATION

CROSS-REFERENCE TO RELATED APPLICATION

This application claims the priority benefit of U.S. provisional application Ser. No. 63/324,646, filed on Mar. 29, 2022. The entirety of each of the above-mentioned patent applications is hereby incorporated by reference herein and made a part of this specification.

BACKGROUND

Technical Field

The disclosure relates to a head-mounted display device and a control method for eye-tracking operation, and in particular, to a head-mounted display device with a movable sensor and a control method for eye-tracking operation.

Description of Related Art

In the actual application situation of the head-mounted display device of virtual reality and augmented reality, the sensor has to be placed very close to the user's head due to the limitation of the placement position of the sensor (or camera) in terms of hardware. Practical limitations include, for example, in order to reduce the size of the head-mounted device or the glasses, the sensor cannot be placed at a proper distance from the user's head to obtain a better view angle and orientation for detecting the movement of the user's eyes. Another example is that head-mounted display devices must image virtual scenes through optical lenses. In order to make it easier for the sensor to observe the user's eye movement, it needs to be placed between the user's head and the optical lens. Instead of having the sensor observe the eye through an optical lens, the distance between the camera or sensor and the user's head is shortened. In the case of the above two limiting examples, the distance between the user's head and the camera or sensor has to be shortened. However, at a short distance, the observation mode of the downside or the side is very likely to cause the problem of obscuring the view angle, thus making it difficult for the sensor to observe the real eye movement of the user.

SUMMARY

The invention provides a head-mounted display device and a control method for eye-tracking operation which uses a movable sensor to solve the problem that the user's image is covered.

The head-mounted display device of the invention includes a frame, a track, a sensor and a controller. The track is disposed on a peripheral region of the frame. The sensor is disposed on the track, and is configured to capture a target image of a target area. The controller is coupled to the sensor, is configured to generate a control signal according to the target image, and adjust a position of the sensor on the peripheral region by moving the sensor according to the control signal.

The control method for eye-tracking operation of the invention includes: providing a track to be disposed on a peripheral region of a frame of a head-mounted display device; disposing a sensor on the track, and providing the sensor to capture a target image of a target area; and providing a controller to generate a control signal according to the target image, and adjust a position of the sensor on the peripheral region by moving the sensor according to the control signal.

Based on the above, the head-mounted display device of the present invention provides movable sensors. And according to whether the sensor captures the target image of the target area, the sensor can be moved on a track. When the path for the sensor to capture the target image is blocked, the controller can move the sensor to resolve the blocked state of the sensor for capturing the target image. In this way, the sensor can effectively capture the target image and ensure the correctness of the eye-tracking operation.

DESCRIPTION OF THE EMBODIMENTS

Figure 1:
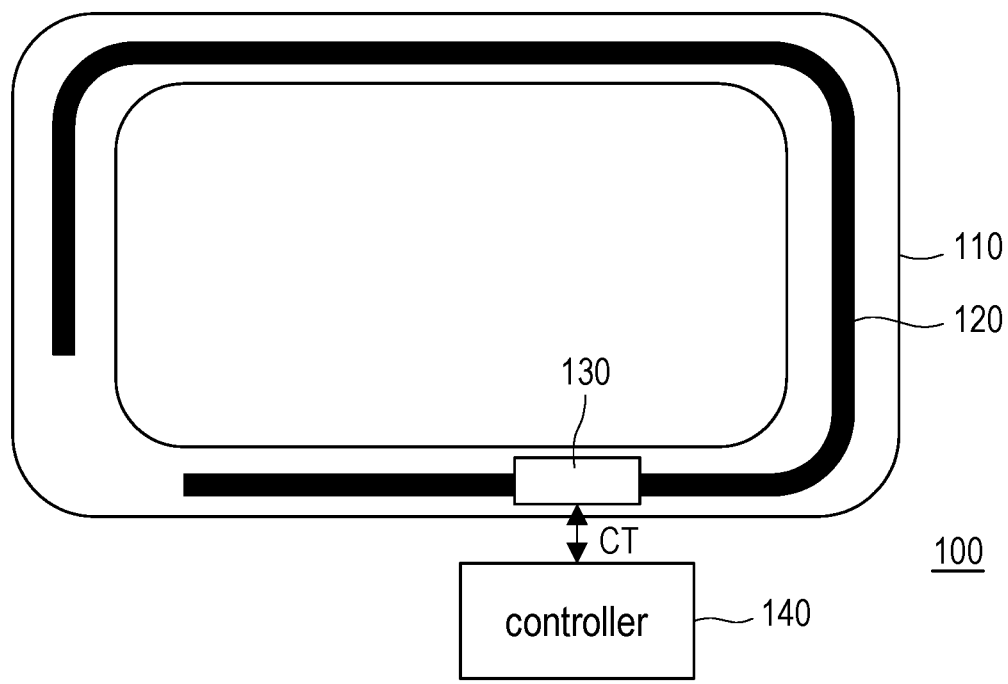
FIG. 1 is a schematic diagram of a head-mounted display device according to an embodiment of the present invention.
[0008]

Referring to FIG. 1, FIG. 1 is a schematic diagram of a head-mounted display device according to an embodiment of the present invention. The head-mounted display device 100 includes a frame 110, a track 120, a sensor 130 and a controller 140. The track 120 is disposed on a peripheral region of the frame 110. The sensor 130 is disposed on the track 120. The sensor 130 can be an image capture device, such as a camera, and is used to capture a target image of a target area. In the embodiment, the target area may be the area where the eyeballs of the user of the head-mounted display device 100 are located, and the target image may be the eyeballs image of the user.

Besides, the controller 140 is coupled to the sensor 130. The controller 140 can generate a control signal CT according to the target image obtained by the sensor 130. The controller 140 can also transmit the control signal CT to the sensor 130, and make the sensor 130 move on the track 120, so as to adjust the position of the sensor 130 on the peripheral region of the frame 110.

In details, the controller 140 can analyze the target image obtained by the sensor 130, and generate identification information by determining whether there is a target object image in the target image, and generate the control signal CT according to the identification information. To further illustrate, the controller 140 can generate the control signal CT by recognizing whether the target object image in the target image is complete and clear. In an embodiment of the present invention, when the target object image is not complete and clear, the controller 140 can generate the control signal CT and adjust the position of the sensor 130 through the control signal CT. On the other hand, when the target object image is complete and clear enough, the controller 140 can maintain the position of the sensor 130 and provide the target image to perform an eye-tracking operation. In the embodiment, the target object image may be an eyeball image of the user.

It should be noted that, in the embodiment of the invention, based on the user's eyeballs may move dynamically due to view angle requirements. Therefore, at the position where the sensor 130 is located, it may not be possible to capture a complete and clear (or completely uncapturable) eyeball image of the user. As a result, the eye-tracking operation at this time will not be effectively completed. In the embodiment, when the eyeball image captured by the sensor 130 is incomplete and clear, the controller 140 can generate the control signal CT to make the sensor 130 move along the track 120, so as to adjust the orientation of the sensor 130. In this way, the controller 140 can adjust the position of the sensor 130 one or more times, so that the sensor 130 can effectively capture a complete and clear eyeball image, and effectively execute the eye-tracking operation.

In the embodiment, the controller 140 can be a processor with computing capability. Alternatively, the controller 140 can be designed through Hardware Description Language (HDL) or any other digital circuit design methods known to those skilled in the art. Then, the hardware circuit is realized by means of Field Programmable Gate Array (FPGA), Complex Programmable Logic Device (CPLD) or Application-specific Integrated Circuit (ASIC).

The controller 140 can be configured in any suitable position in accordance with the mechanism design of the head-mounted display device 100, without specific limitation.

Figure 2:
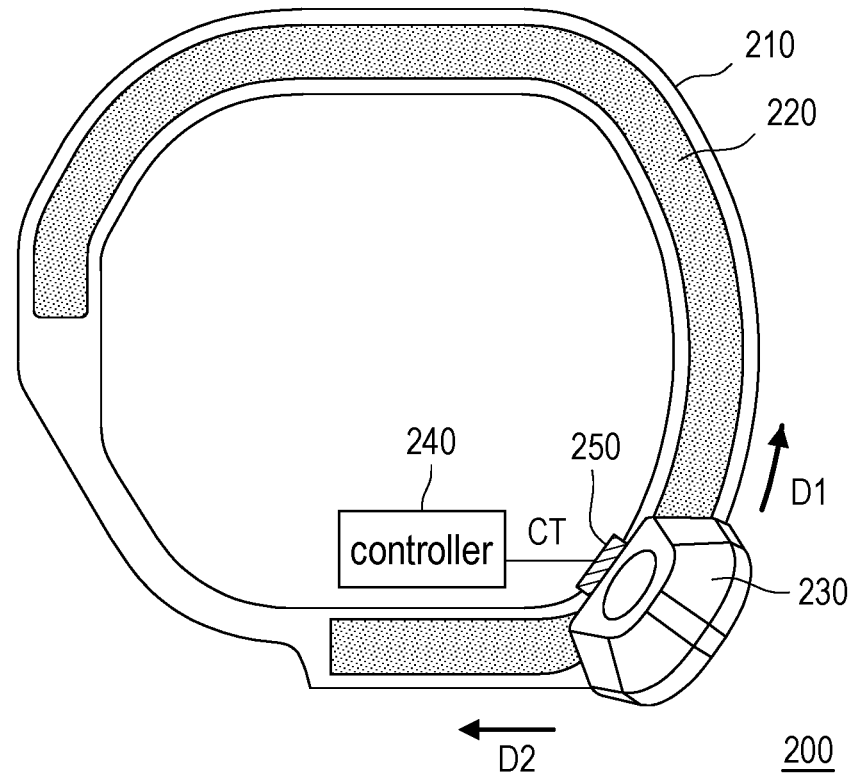
FIG. 2 is a schematic diagram of a head-mounted display device according to another embodiment of the present invention.

Referring to FIG. 2 below, FIG. 2 is a schematic diagram of a head-mounted display device according to another embodiment of the present invention. The head-mounted display device 200 includes a frame 210, a track 220, a sensor 230, a controller 240, and an actuator 250. The track 220 is disposed on the a peripheral region of the frame 210. The actuator 250 can be disposed on the track 220. The actuator 250 can also be used to carry the sensor 230, and make the sensor 230 move along a direction D1 or a direction D2 on the track 220 according to the received control signal CT.

Details about the generation of the control signal CT have been described in detail in the embodiment of FIG. 1, and will not be repeated here.

In the embodiment, the track 220 can be constructed using slide rails known to those skilled in the art, and the actuator 250 can be implemented using a driving motor and related mechanical structures known to those skilled in the art, without fixed limitations.

By the way, a change in position as well as a change in angle can be produced based on the movement of the actuator 250 on the track 220. When the sensor 230 moves on the track 220, the position of the sensor 230 and the view angle for image capturing of the target area may also be changed correspondingly. That is to say, in the embodiment, the position and view angle of the sensor 230 may have a fixed relationship. This relationship can be pre-established with unique lookup information and provided to the controller 240 for lookup.

Figure 3:
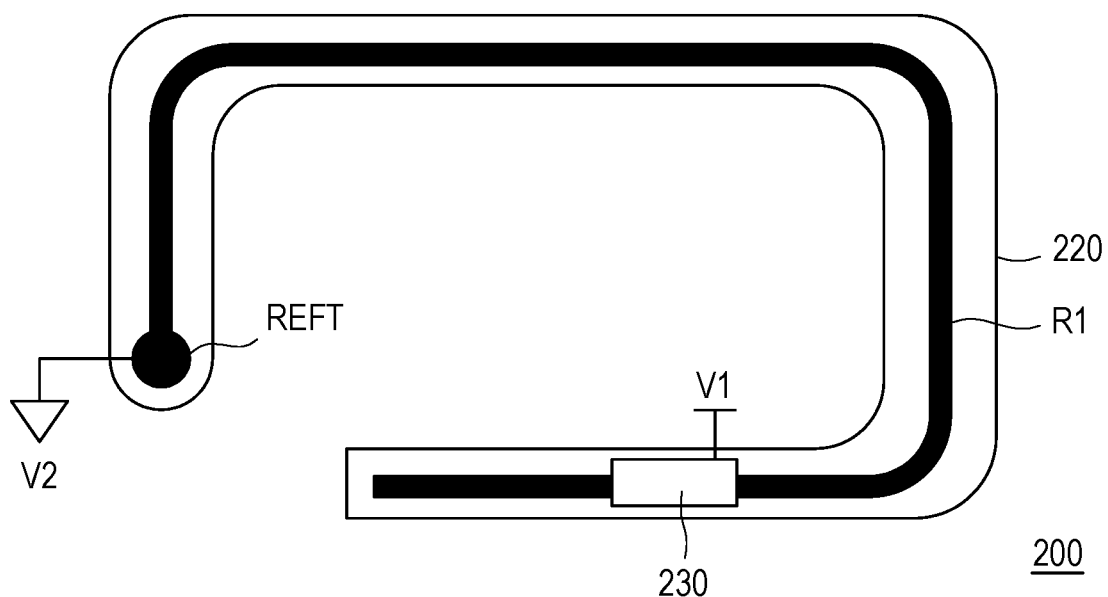
FIG. 3 is a schematic diagram of a partial structure of the head-mounted display device 200 according to the embodiment of FIG. 2 of the present invention.

It is especially worth mentioning that, in order to effectively execute the eye-tracking operation, the head-mounted display device 200 must effectively control the position of the sensor 230. And know the view angle of the sensor 230 through the position of the sensor 230. Referring to FIG. 3 here, FIG. 3 is a schematic diagram of a partial structure of the head-mounted display device 200 according to the embodiment of FIG. 2 of the present invention. In FIG. 3, the head-mounted display device 200 further includes a resistor R1. The resistor R1 can be disposed in the track 220 and has the same extended tendency as the track 220. The sensor 230 is disposed on the resistor R1 and electrically connected with the resistor R1. In the embodiment, the sensor 230 can detect a resistance value between its position and a reference point REF of the resistor R1 to obtain a position of the sensor 230.

In details, the reference point REF may be set at one end of the resistor R1. The reference point REF of the resistor R1 is used to receive a reference voltage V2. The sensor 230 can provide a voltage V1 on the terminal in contact with the resistor R1 when the sensor 230 is performing the measurement action at the current position. The sensor 230 can know the resistance value between its position and the reference point REF on the resistor R1 through the output current of the voltage V1, and thereby know the position of the sensor 230 on the track 220. In the embodiment, the voltages V1, V2 are different, wherein the voltage V2 may be a reference ground voltage.

It should be noted that, in other embodiments of the invention, the sensor 230 can also calculate the resistance value between the position of the sensor 230 and the reference point REF of the resistor R1 by providing current to the resistor R1 and measuring the voltage at the position.

Figure 4:
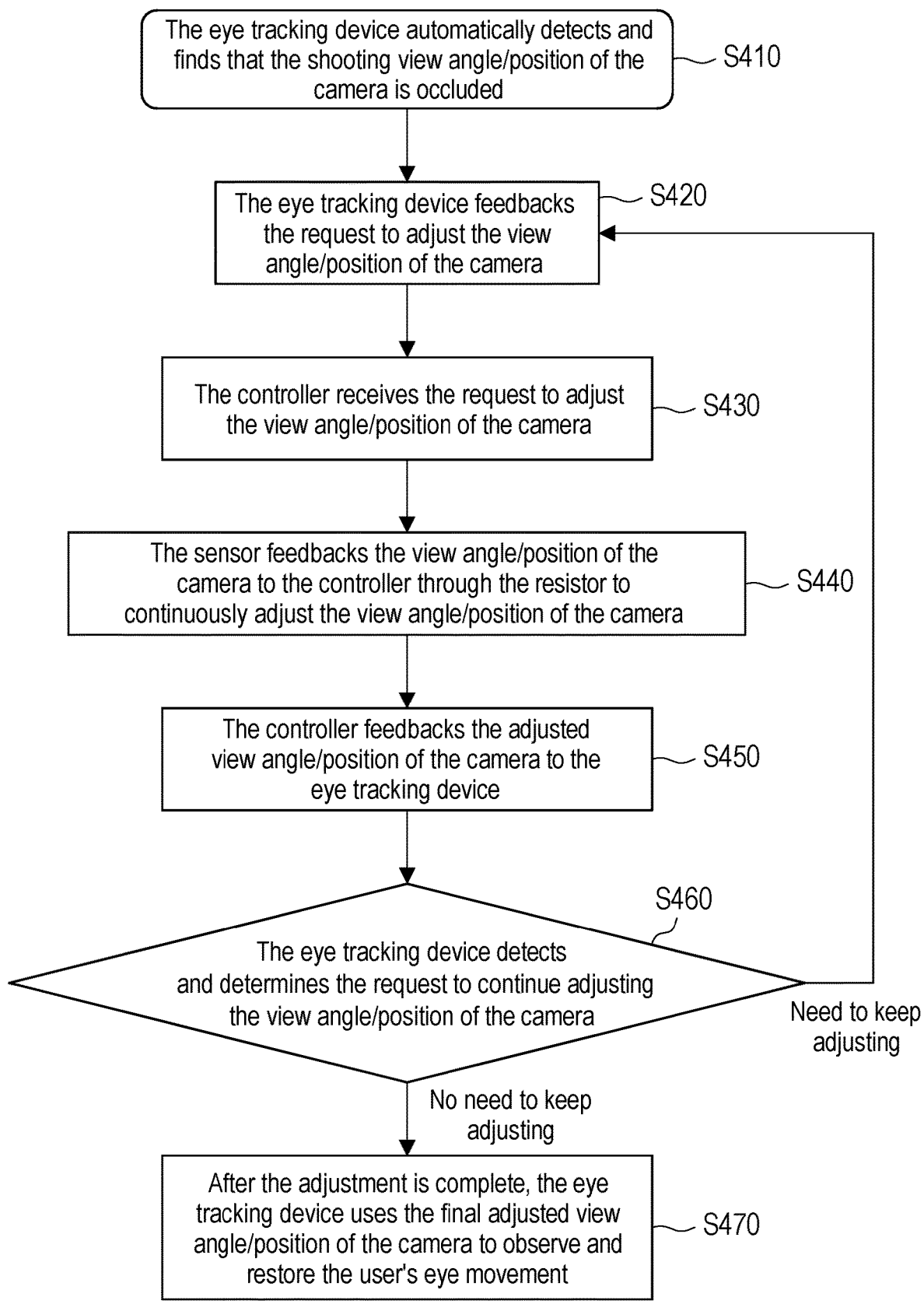
FIG. 4 is a flow chart of the position adjustment operation of the sensor in the eye-tracking operation according to an embodiment of the present invention.

Referring to FIG. 4 below, FIG. 4 is a flow chart of the position adjustment operation of the sensor in the eye-tracking operation according to an embodiment of the present invention. In step S410, when the eye tracking device of the head-mounted display device automatically detects and finds that the shooting view angle or position of the camera (sensor) is occluded, step S420 can be executed. In the embodiment, controller can analyze whether there is enough area of the eyeball image in the target image obtained by the camera to know that the camera's shooting view angle or position is occluded, and notify the eye tracking device. In step S420, the eye tracking device feedbacks the request to adjust the view angle or position of the camera. Then, in step S430, the controller can receive the request from the eye tracking device to adjust the view angle or position of the camera, and provide a control signal to the actuator to move the camera on the track for further adjusting the view angle or position of the camera.

In step S440, the camera can feedback its view angle or position to the controller according to the resistance disposed on the track, and continue the subsequent adjustment of the view angle or position of the camera. In step S450, the controller can feedback the view angle or position of the camera to the eye tracking device to provide relevant information for performing the eye-tracking operation. In step S460, the eye tracking device can detect and determine whether there is a request to continue adjusting the view angle or position of the camera. Wherein, if the eyeball image in the target image captured by the camera is occluded and cannot be recognized, the eye tracking device can send out the request for continued adjustment. In contrast, if the eyeball image in the target image captured by the camera is not occluded, and the eye-tracking operation can be performed effectively, the eye tracking device may decide not to continue the adjustment.

When the view angle or position of the camera needs to be adjusted continuously, steps S420 to S460 can be re-executed. When the view angle or position of the camera does not need to be further adjusted, step S470 can be executed, indicating that the adjustment has been completed.

The eye-tracking operation can use the final adjusted view angle or position of the camera to observe and restore the user's eye movement.

It should be noted that, in the embodiment, the controller can generate a control signal according to a preset adjustment step value, and the camera can move a preset distance in each adjustment step through the control signal. The above-mentioned preset distance can be set by engineering personnel without any fixed limitation.

Figure 5:
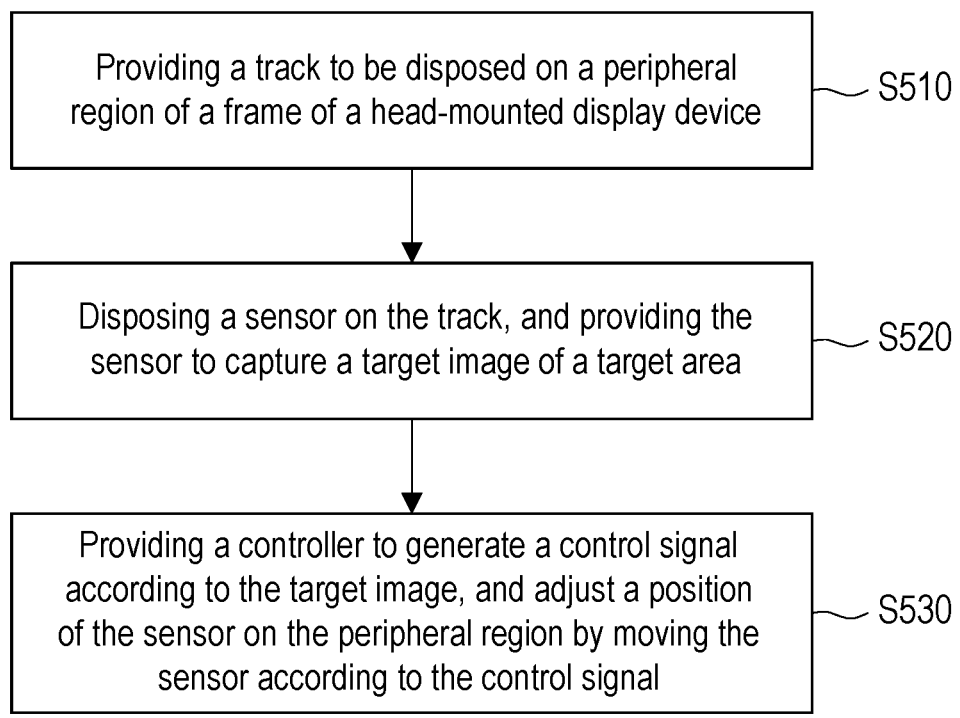
FIG. 5 is a flowchart of a controlling method for an eye-tracking operation according to an embodiment of the present invention.

Referring to FIG. 5 below, FIG. 5 is a flowchart of a controlling method for an eye-tracking operation according to an embodiment of the present invention. Wherein, in step S510, providing a track to be disposed on a peripheral region of a frame of a head-mounted display device. In step S520, disposing a sensor on the track, and providing the sensor to capture a target image of a target area. In step S530, providing a controller to generate a control signal according to the target image, and adjust a position of the sensor on the peripheral region by moving the sensor according to the control signal.

The action details of steps S510 to S530 have been described in detail in the foregoing embodiments and implementations, and will not be repeated here.

In summary, the head-mounted display device of the invention disposes the track on the peripheral region of the frame, and enables the sensor to move on the track. When the sensor is shooting the target image, if the target object image cannot be captured correctly, the position and the shooting view angle of the sensor can be adjusted by moving the sensor along the track. In this way, the shooting action of the target object image is successfully completed, and the correctness of the eye-tracking operation is maintained.

What is claimed is:

1. A head-mounted display device, comprising:
    a frame;
    a track, disposed on a peripheral region of the frame;
    a sensor, disposed on the track, is configured to capture a target image of a target area;
    an actuator, disposed on the track and connected to the sensor; and
    a controller, coupled to the sensor, is configured to generate, after the target image is captured, a control signal according to an area of an eyeball image in the target image,
    wherein the actuator moves the sensor on the track according to the control signal to adjust a position of the sensor on the peripheral region
    wherein when the sensor moves on the track, the position of the sensor and a view angle for capturing the target area are changed correspondingly, and a fixed relationship between the position and the view angle of the sensor is pre-established as lookup information and provided to the controller,
    wherein the controller is configured to obtain the view angle of the sensor according to the position of the sensor.

2. The head-mounted display device according to claim 1, wherein the controller recognizes whether there is a target object image in the target image to generate an identification information, and the controller generates the control signal according to the identification information.

3. The head-mounted display device according to claim 2, wherein the controller recognizes whether the target object image in the target image is complete and clear, and when the target object image is not complete and clear, the controller generates the control signal to adjust a position of the sensor.

4. The head-mounted display device according to claim 3, wherein when the target object image is complete and clear, the controller provides the target image to perform an eye-tracking operation, wherein the target object image is the eyeball image.

5. The head-mounted display device according to claim 1, further comprises:
    a resistor, disposed on the track and electrically connected with the sensor.

6. The head-mounted display device according to claim 5, wherein the controller or the sensor detects a resistance value between a reference point of the resistor and the sensor to obtain a position information of the sensor.

7. The head-mounted display device according to claim 1, wherein the controller generates the control signal according to a preset adjustment step value, and adjusts the position of the sensor to move a preset distance according to the preset adjustment step value one or more times.

8. A control method for eye-tracking operation, comprising:
    providing a track to be disposed on a peripheral region of a frame of a head-mounted display device;
    disposing a sensor on the track, and providing the sensor to capture a target image of a target area; and
    providing a controller to generate, after the target image is captured, a control signal according to an area of an eyeball image in the target image;
    moving, by an actuator disposed on the track and connected to the sensor, the sensor on the track according to the control signal to adjust a position of the sensor on the peripheral region, wherein when the sensor moves on the track, the position of the sensor and a view angle for capturing the target area are changed correspondingly;
    pre-establishing a fixed relationship between the position and the view angle of the sensor as lookup information and providing the lookup information to the controller; and
    obtaining, by the controller, the view angle of the sensor according to the position of the sensor.

9. The control method according to claim 8, wherein the step of providing the controller to generate the control signal according to the target image comprises:
    recognizing whether there is a target object image in the target image to generate an identification information by the controller; and
    generating the control signal according to the identification information by the controller.

10. The control method according to claim 9, further comprises:
    recognizing whether the target object image in the target image is complete and clear by the controller; and
    when the target object image is not complete and clear, generating the control signal to adjust a position of the sensor.

11. The control method according to claim 10, further comprises:
    when the target object image is complete and clear, providing the target image to perform an eye-tracking operation by the controller, wherein the target object image is the eyeball image.

12. The control method according to claim 8, further comprises:
    disposing a resistor on the track, and the resistor is electrically connected with the sensor; and detecting a resistance value between a reference point of the resistor and the sensor to obtain a position information of the sensor.

13. The control method according to claim 8, further comprises:
  setting a preset adjustment step value; and
  adjusting the position of the sensor to move a preset distance according to the preset adjustment step value one or more times.

* * * * *